US011693148B1

(12) United States Patent
Yang et al.

(10) Patent No.: US 11,693,148 B1
(45) Date of Patent: Jul. 4, 2023

(54) ACTIVE POINTING AND TRACKING SYSTEM

(71) Applicant: United States of America as represented by the Administrator of NASA, Washington, DC (US)

(72) Inventors: Guangning Yang, Greenbelt, MD (US); Jeffrey Chen, Greenbelt, MD (US)

(73) Assignee: United States of America as represented by the Administrator of NASA, Washington, DC (US)

(*) Notice: Subject to any disclaimer, the term of this patent is extended or adjusted under 35 U.S.C. 154(b) by 1,002 days.

(21) Appl. No.: 16/532,684

(22) Filed: Aug. 6, 2019

Related U.S. Application Data

(60) Provisional application No. 62/838,632, filed on Apr. 25, 2019.

(51) Int. Cl.
*G01V 7/04* (2006.01)
*G01V 7/16* (2006.01)
*G01C 3/08* (2006.01)

(52) U.S. Cl.
CPC ... *G01V 7/04* (2013.01); *G01C 3/08* (2013.01); *G01V 7/16* (2013.01)

(58) Field of Classification Search
CPC ............... G01V 7/04; G01V 7/16; G01C 3/08
USPC ...................................................... 356/4.01
See application file for complete search history.

(56) References Cited

U.S. PATENT DOCUMENTS

| 9,261,625 | B2* | 2/2016 | Larigani | ............... G01V 7/04 |
| 9,411,569 | B1 | 8/2016 | Schnase et al. | |
| 2016/0328410 | A1 | 11/2016 | Schnase et al. | |
| 2016/0335291 | A1 | 11/2016 | Schnase et al. | |
| 2016/0337479 | A1 | 11/2016 | Schnase et al. | |

* cited by examiner

*Primary Examiner* — Daniel L Murphy
(74) *Attorney, Agent, or Firm* — Christopher O. Edwards; Trenton J. Roche

(57) ABSTRACT

A satellite includes a fast tracking mirror ("mirror") placed at or near center of mass (CoM) of the satellite along a line of sight between the CoMs of two satellites. The satellite also includes a detector at a distance away from the mirror. The mirror is adjusted to maintain the distance between the mirror and the detector, when a location of the detector changes due to pitch and yaw of the satellite.

11 Claims, 4 Drawing Sheets

100

200

300

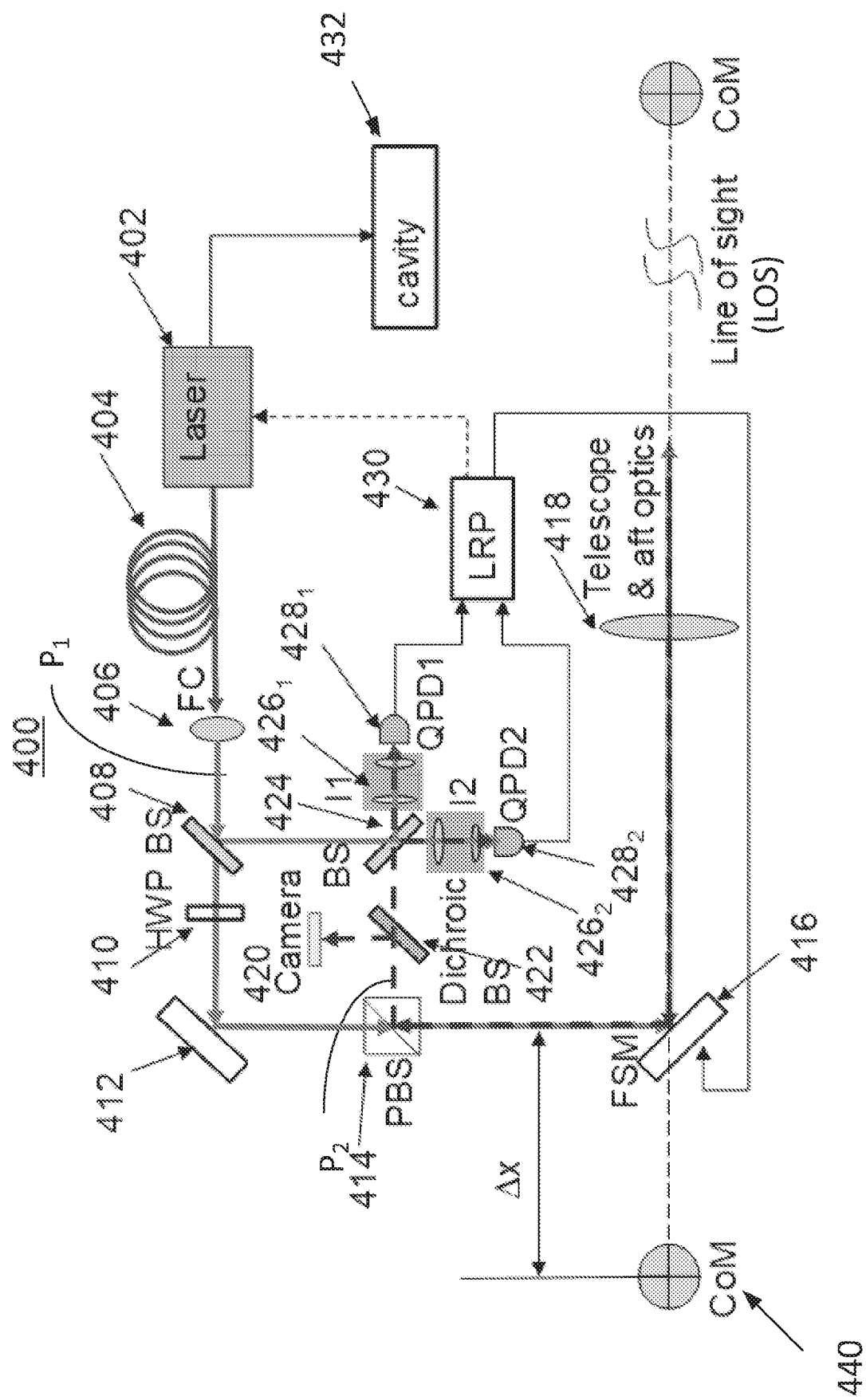

ACTIVE POINTING AND TRACKING SYSTEM

STATEMENT OF FEDERAL RIGHTS

The invention described herein was made by employees of the United States Government and may be manufactured and used by or for the Government for Government purposes without the payment of any royalties thereon or therefore.

FIELD

Some embodiments generally pertain to a tracking system, and more specifically, to a laser satellite to laser satellite tracking for gravity measurements.

BACKGROUND

In laser satellite to laser satellite tracking for gravity measurements, the satellite to satellite separations are measured to the highest precision possible, e.g., sub micrometer. The measurement is conducted with laser links between two satellites, where laser optical phase change is measured as a function of time. One major error source is the optical path length change caused by the satellite's yaw and pitch.

With current tracking systems, the path length change compensation is achieved by way of a sophisticated optical bench design where the transmit and receive apertures are separated. However, a simplified optical configuration may be more beneficial.

SUMMARY

Certain embodiments of the present invention may provide solutions to the problems and needs in the art that have not yet been fully identified, appreciated, or solved by current tracking systems. For example, some embodiments generally pertain to an active pointing and tracking system to correct the yaw and pitch range error in laser satellite to satellite tracking (SST).

In an embodiment, a satellite includes a fast tracking mirror ("mirror") placed at or near center of mass (CoM) of a satellite and centered on a line of sight (LOS) between CoMs of two satellites. The satellite also includes a detector at a distance away from the mirror. Placement of the mirror allows for the distance from the mirror at the CoM to the detector to remain constant under pitch and yaw of the satellite. The mirror is tilted to compensate for the pitch and yaw of the satellite, thereby directing an incoming laser beam to the detector, when a location of the detector changes due to pitch and yaw of the satellite around its CoM.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a diagram illustrating an arrangement of components within a satellite, according to an embodiment of the present invention.

DETAILED DESCRIPTION OF THE EMBODIMENTS

Some embodiments are directed to measuring the distance between two satellites - a first satellite and a second satellite - on the order of a nanometer.

These satellites may be 100s or 1000s of kilometers (km) apart. To determine the distance between the satellites, the optical phase can be measured.

Each satellite includes a receiver and a transmitter. For example, a transmitter of a first satellite may send a beam across to a receiver of a second satellite. Using this example, depending on the placement of the receiver, the receiver may not be at or near the center of mass (CoM) within the second satellite. When the second satellite begins to move around the CoM, i.e., the second satellite performs pitch and yaw maneuvers, the yaw maneuvers cause the location of the detector to change, thereby increasing or decreasing the measured path length between the two satellites. See, for example, FIG. 1. In other words, the second satellite's movement produces a range error, which has to be corrected; otherwise, the measurement is incorrect.

Figure 1:
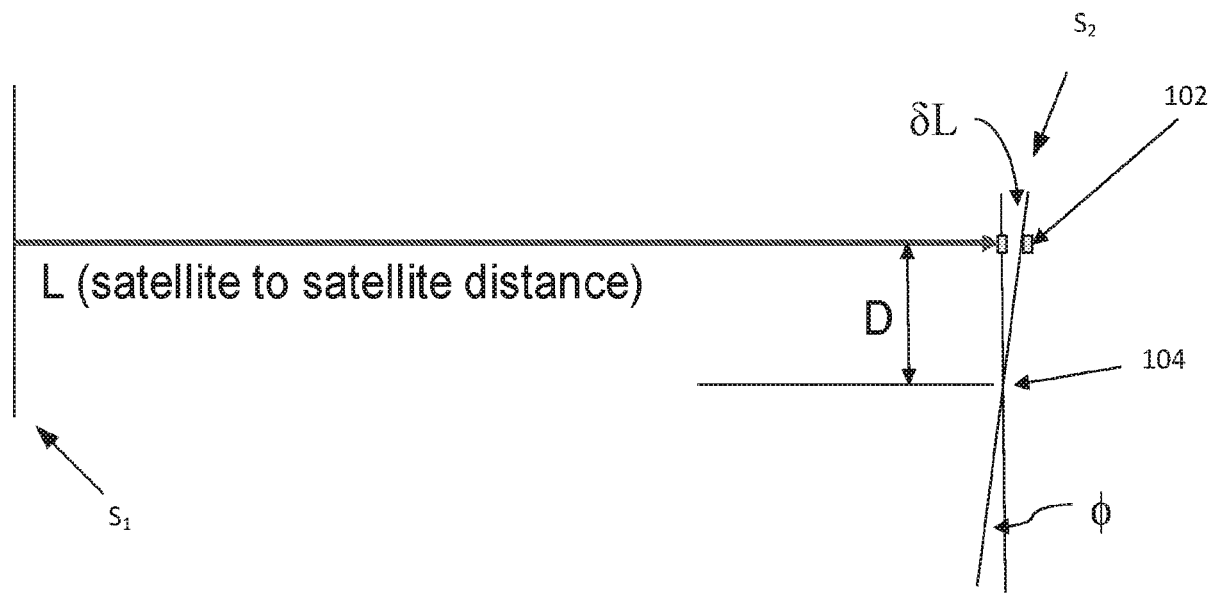
FIG. 1 is a diagram illustrating path length measurement error with satellite yaw and pitch, according to an embodiment of the present invention.

FIG. 1 is a diagram 100 illustrating path length change with satellite yaw and pitch, according to an embodiment of the present invention. In FIG. 1, L is the length from the CoM of first satellite $S_1$ to the CoM of second satellite $S_2$. In this embodiment, path length to detector 102 located at a distance D away from pivot point 104, which is the CoM of $S_2$, changes with a yaw (or pitch angle $\Phi$) such that $$\delta L = D * \sin(\Phi) \qquad \text{Equation (1)}$$

where $\delta L$ is a measurement error of path length L between the CoMs of satellites $S_1$ and $S_2$.

Figure 2:
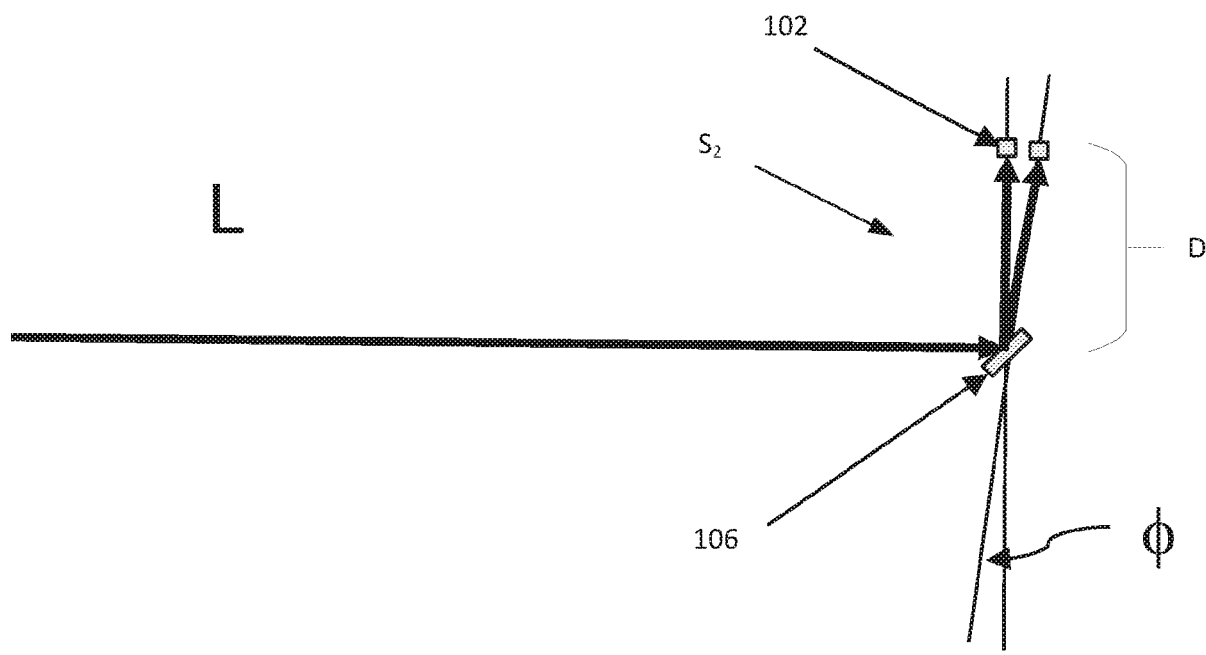
FIG. 2 is a diagram illustrating cancellation of a path length measurement error with an active pointing and tracking system, according to an embodiment of the present invention.

FIG. 2 is a diagram 200 illustrating cancellation of a path length measurement error with an active pointing and tracking system, according to an embodiment of the present invention.

In an embodiment, a fast steering mirror (or mirror) 106 is placed at the CoM of satellite $S_2$ with detector 102 being distance D away from the mirror. The yaw or pitch movement of satellite $S_2$ does not induce the measurement error of path length L any more. The yaw or pitch angle change is compensated with mirror 106 angle turning. This may be part of the active pointing and tracking in laser link.

Further, the path length L with this optical configuration is not changed. For example, for yaw and pitch angles, the following equation may now be used.

$$\delta L = 0 \qquad \text{Equation (2)}$$

Figure 3:
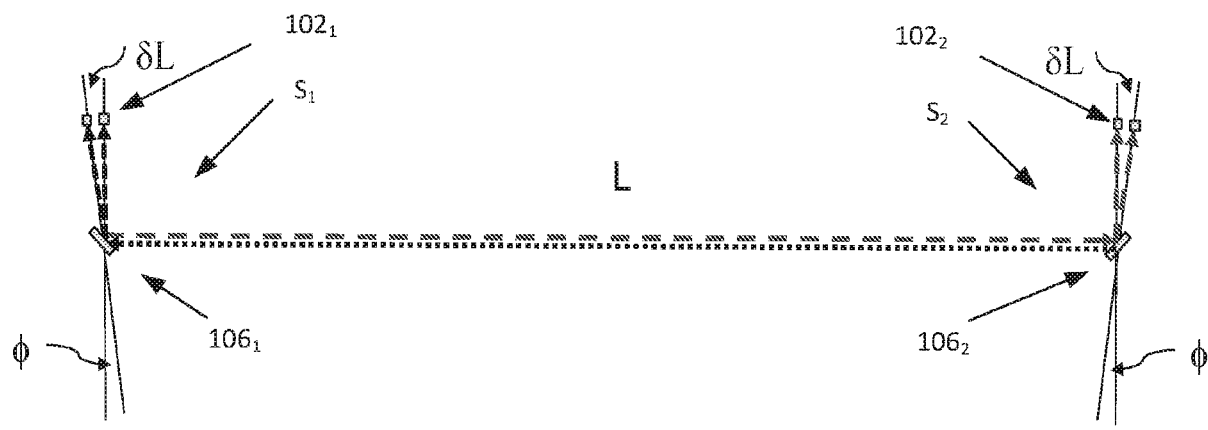
FIG. 3 is a diagram illustrating a tracking mirror configuration for each satellite, according to an embodiment of the present invention.

FIG. 3 is a diagram 300 illustrating a tracking mirror configuration for each satellite, according to an embodiment of the present invention.

In an embodiment, each satellite $S_1$ and $S_2$ include a fast tracking mirror (or mirror) $106_1, 106_2$. For example, mirrors $106_1, 106_2$ are placed at the CoM of each satellite $S_1, S_2$. When the location of detector $102_1$ or $102_2$ changes, the angle of mirror $106_1$ or $106_2$ is adjusted to compensate for this change. This way, there is no measurement error even with satellites $S_1$ and $S_2$ pitch and yaw maneuvers. This is primarily because detector $102_1$ or $102_2$ is moving around satellite's CoM (e.g., mirror $106_1$ or $106_2$).

The control signals for mirror angle adjustment are derived from the spacecraft pointing error signals arising from the pitch and yaw. The sensing detail of this off pointing will be described in FIG. 4.

Simply put, this configuration compensates for the error introduced by the pitch and yaw maneuvers.

FIG. 4 is a diagram illustrating an arrangement of components within satellite 400, according to an embodiment of the present invention.

In an embodiment, mirror 416 is placed at CoM 440. However, such an embodiment may also require an accelerometer to be placed at CoM 440. This complicates placement of mirror 416. In another embodiment, mirror 416 is placed on line of sight (LOS), a short distance $\Delta x$ away from CoM 440. The ranging error $\delta L$ introduced by the displacement $\Delta x$ is given by $$\delta L = \Delta x \left( \theta_{pitch} \delta \theta_{pitch} + \theta_{yaw} \delta \theta_{yaw} \right) \quad \text{Equation (3)}$$

where $\theta_{pitch}$ and $\theta_{yaw}$ are the static angles in pitch and yaw, respectively, $\delta\theta_{pitch}$ and $\delta\theta_{yaw}$ are the jitters of $\theta_{pitch}$ and $\theta_{yaw}$.

Satellite 400, as shown in FIG. 4, may be operated in two modes–acquisition mode and fine tracking and science mode.

ACQUISITION MODE

In acquisition mode, satellite 400 and another satellite (not shown) point to each other to accomplish course pointing and tracking alignment. In those embodiments, camera 420 captures the received incoming beam. For example, the received incoming beam is tuned to a predefined wavelength ($\lambda_1$) and is efficiently reflected by dichroic beam splitter (BS) 422 to camera 420. After course alignment between the two satellites is achieved, satellite 400 may switch to fine tracking and science mode.

FINE TRACKING AND SCIENCE MODE

The received incoming beam from the other satellite may in some embodiments be tuned to a predefined wavelength ($\lambda_2$). In these embodiments, dichroic BS 422 may have high transmittance for this wavelength such that the tuned wavelength passed through dichroic BS 422 to reach BS 424. Thereafter, the tuned wavelength may be detected by quadrant photodiode detector (QPD) 428₁ and QPD 428₂ to start the fine tracking and science measurement mode.

In an embodiment, satellite 400 includes a transmit laser 402 with output fiber 404, a fiber collimator (FC) 406, BS 408, a half wave plate (HWP) 410, a steering mirror 412, a polarizing beam splitter (PBS) 414, a fast steering mirror (FSM) 416, a telescope and aft optics 418, the camera 420, the dichroic BS 422, the BS 424, two imaging optics system 426₁ and 426₂, two QPDs 428₁ and 428₂, a laser ranging processor (LRP) 430, and an optical cavity 432. It should be noted that the embodiments are not limited to these components and other components or features may be included to carry out the operation and functionality of satellite 400.

Transmit laser 402 in some embodiments transmits a laser beam to another satellite (not shown) along the LOS. The FC 406 collimates the laser beam delivered through the optic fiber 404. The BS 408 picks off a small fraction of the transmit laser beam that serves as the local oscillator and has the same linear polarization as the received incoming beam. The HWP 410 rotates the polarization of the transmit laser by 90°.

Note that in certain embodiments mirror 416 is a fast steering mirror that is placed at the CoM of satellite 400. Fast steering mirror may have high response speed, which can compensate high frequency pointing errors in the system. An optional steering mirror 412 functions as a mechanism to adjust the pointing ahead angle that may vary along the orbit. The control to steering mirror 412 can be preprogrammed because the pointing ahead angle can be pre-determined (no feedback needed). This steering mirror 412 can be eliminated if the pointing ahead angle variation is negligible along the orbit.

Telescope optics 418 is shared by the transmitted and received laser beams, reducing the size and mass of the instrument. It may increase the size of the transmit laser beam, thereby increasing the transmission range of the transmit laser beam.

As shown in FIG. 4, a laser beam (or signal) is received by the same telescope optics 418 from the other satellite. Note that transmit laser path $P_1$ and receive laser path $P_2$ are in parallel with one another but also run in counter to one another. In other words, the transmitted and received laser beams are counter propagated along the LOS and steered by mirror 416.

Before that, when satellite 400 receives the received laser beam, telescope optics 418 may reduce the size of the received laser beam to facilitate transmission of the received laser beam along receive laser path $P_2$. The aft optics of 418 images the telescope aperture onto the center spot of mirror 416 on LOS, and the imaging optics system 426₁ and 426₂ image the center spot of the FSM 416 onto the detector surfaces of the two QPDs 428₁ and 428₂. When the incident angle changes at the telescope aperture, the incoming beam spots on mirror 416 and QPDs 428₁ and 428₂ do not shift while its wave-front on QPDs 428₁ and 428₂ is tilted proportionally to the incident angle.

BS 424 splits both the incoming beam and the local oscillator beam equally (50%/50%). The beatnote between the incoming beam and the local oscillator beam are detected coherently by both QPDs 428₁ and 428₂ (heterodyne detection). Each QPD has four detector quadrants, and each quadrant is a separated PIN photodiode pixel. The beatnote detected by each quadrant is amplified by a trans-impedance amplifier (TIA) and subsequently sent to a phase meter in LRP 430. From the phase measurements of the beatnotes from four quadrants on each QPD, the LRP 430 derives pointing error signals proportional to the wave-front tilts of the incoming beam at the QPDs. From the pointing error signals, the feedback signals can be derived by the LRP to control the FSM 416 to suppress the wave-front tilts on the QPDs. This ensures the transmitted beam is counter propagated along the LOS back to the other satellite (except for a small pointing ahead angle). For the same quadrant, the beatnote on QPDs 428₁ and that on 428₂ have essentially the same amplitude but 180° out of phase (i.e., having opposite sign) so the phase difference between the two beatnotes may be taken to double the signal. Once the wave-front tilts are suppressed, the change in L can be derived accurately from such phase measurements.

The transmitted laser beam backscattered at the telescope optics 418 generates spurious beatnotes and hence may degrade the phase measurements. For the same quadrant, such spurious beat-note on one QPD and that on the other QPD are equal in magnitude and phase. By splitting the beams 50%/50% with I}8 BS 424 and taking the phase difference between the two beatnotes, the measurement error arising from the unwanted backscattering can be essentially eliminated.

The laser 402 on one satellite (referred to as the master) is frequency locked to an optical cavity 432 to stabilize its wavelength. The wavelength of the laser 402 on the other satellite (referred to as the slave) is frequency offset locked to the incoming laser from the master, using a phase locked loop (PLL). The LRP 430 derives the error signal from the beatnotes and generates feedback signal to control the laser wavelength in the PLL.

According to Eq. (3), the measurement error $\delta L$ can be reduced by placing the FSM 416 on LOS, and by reducing $\Delta x$, $\theta_{pitch}$, $\theta_{yaw}$, $\delta\theta_{pitch}$ and $\delta\theta_{yaw}$. Since the three factors in Eq. (3) can be made small, $\delta L$ may be made negligible. Furthermore, $\delta L$ can be computed and removed from the measurement if knowledge of $\Delta x$, $\theta_{pitch}$, $\theta_{yaw}$, $\delta\theta_{pitch}$ and $\delta\theta_{yaw}$ are sufficiently accurate.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A satellite, comprising:
a fast tracking mirror ("mirror") placed at or near a center of mass (CoM) of a satellite and centered on a line of sight (LOS) between CoMs of two satellites; and
a detector at a distance away from the mirror, wherein
placement of the mirror allows for the distance from the mirror at the COM to the detector to remain constant under pitch and yaw of the satellite, and
the mirror is tilted to compensate for the pitch and yaw of the satellite, thereby directing an incoming laser beam to the detector, when a location of the detector changes due to pitch and yaw of the satellite around its CoM.

2. The satellite of claim 1, wherein the mirror directs a transmit laser beam to another satellite, such that the transmit laser beam and a received laser beam are counter propagated along a LOS back to the other satellite.

3. The satellite of claim 1, further comprising:
telescope optics configured to reduce a size of a received laser beam to facilitate transmission of the received laser beam along a receive laser path.

4. The satellite of claim 3, wherein a transmit laser beam shares the same telescope optics as the received laser beam by polarization multiplexing.

5. The satellite of claim 3, wherein aft optics of the telescope optics is configured to image a telescope aperture onto a center spot of the mirror on the LOS.

6. The satellite of claim 5, further comprising:
imaging optics configured to image said center spot of the mirror onto surfaces of quadrant photodiode detectors (QPDs).

7. A satellite, comprising:
a fast tracking mirror ("mirror") placed at or near a center of mass (CoM) of a satellite and centered on a line of sight (LOS) between CoMs of two satellites; and
a detector at a distance away from the mirror, wherein
placement of the mirror allows for the distance from the mirror at the COM to the detector to remain constant under pitch and yaw of the satellite, and
the mirror is tilted to compensate for the pitch and yaw of the satellite, thereby directing an incoming laser beam to the detector, when a location of the detector changes due to pitch and yaw of the satellite around its CoM, and
the mirror directs a transmit laser beam to another satellite, such that the transmit laser beam and a received laser beam are counter propagated along a LOS back to the other satellite.

8. The satellite of claim 7, further comprising:
telescope optics configured to reduce a size of a received laser beam to facilitate transmission of the received laser beam along a receive laser path.

9. The satellite of claim 8, wherein a transmit laser beam shares the same telescope optics as the received laser beam by polarization multiplexing.

10. The satellite of claim 8, wherein aft optics of the telescope optics is configured to image a telescope aperture onto a center spot of the mirror on the LOS.

11. The satellite of claim 10, further comprising:
   imaging optics configured to image a center spot of the mirror onto surfaces of quadrant photodiode detectors (QPDs).

* * * * *